US012175125B2

(12) United States Patent
Benisty et al.

(10) Patent No.: US 12,175,125 B2
(45) Date of Patent: Dec. 24, 2024

(54) DATA STORAGE DEVICES, SYSTEMS, AND RELATED METHODS FOR GROUPING COMMANDS OF DOORBELL TRANSACTIONS FROM HOST DEVICES

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 176 days.

(21) Appl. No.: 17/506,212

(22) Filed: Oct. 20, 2021

(65) Prior Publication Data

US 2023/0120600 A1    Apr. 20, 2023

(51) Int. Cl.
*G06F 3/06*    (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0611; G06F 3/0688
See application file for complete search history.

(56) References Cited

U.S. PATENT DOCUMENTS

| 5,740,465 A | 4/1998 | Matsunami et al. |
| 6,434,630 B1 * | 8/2002 | Micalizzi, Jr. ........ G06F 13/385 710/48 |
| 9,720,860 B2 | 8/2017 | Rose et al. |
| 9,996,262 B1 * | 6/2018 | Nemawarkar ........ G06F 3/0673 |
| 10,019,161 B2 | 7/2018 | Sharifie et al. |

(Continued)

FOREIGN PATENT DOCUMENTS

KR    20210080761 A    7/2021

OTHER PUBLICATIONS

Jedec Standard Universal Flash Storage Host Controller Interface (UFSHCI) Version 2.1 (JESD223C), Mar. 2016, p. 23 (Year: 2016).*

(Continued)

*Primary Examiner* — Khoa D Doan
*Assistant Examiner* — Tong B. Vo
(74) *Attorney, Agent, or Firm* — PATTERSON + SHERIDAN, LLP

(57) ABSTRACT

Aspects of the present disclosure generally relate to data storage devices, systems, and related methods that group commands of doorbell transactions from host devices into a plurality of groupings. A controller of a data storage device is configured to receive a plurality of submission doorbell transactions comprising a plurality of commands from a host device. The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings.

20 Claims, 8 Drawing Sheets

(56) References Cited

U.S. PATENT DOCUMENTS

| | | | |
|---|---|---|---|
| 10,282,103 B1 | 5/2019 | Stone et al. | |
| 10,732,897 B2 | 8/2020 | Benisty | |
| 10,949,091 B2 | 3/2021 | Asnaashari et al. | |
| 2010/0262740 A1* | 10/2010 | Borchers | G06F 3/0644 |
| | | | 710/263 |
| 2014/0189212 A1* | 7/2014 | Slaight | G06F 12/0866 |
| | | | 710/22 |
| 2014/0310431 A1 | 10/2014 | Asnaashari et al. | |
| 2017/0060422 A1* | 3/2017 | Sharifie | G06F 3/0659 |
| 2018/0321987 A1 | 11/2018 | Benisty | |
| 2019/0278523 A1* | 9/2019 | Benisty | G06F 3/0658 |
| 2019/0317690 A1* | 10/2019 | Mizoguchi | G06F 13/382 |
| 2021/0374079 A1* | 12/2021 | Shin | G06F 13/382 |
| 2022/0156006 A1* | 5/2022 | Zhao | G06F 3/0607 |

OTHER PUBLICATIONS

International Search Report and Written Opinion for International Application No. PCT/US2022/028464 dated Sep. 19, 2022.

\* cited by examiner

DATA STORAGE DEVICES, SYSTEMS, AND RELATED METHODS FOR GROUPING COMMANDS OF DOORBELL TRANSACTIONS FROM HOST DEVICES

BACKGROUND OF THE DISCLOSURE

Field of the Disclosure

Aspects of the present disclosure generally relate to data storage devices, systems, and related methods that group commands of doorbell transactions from host devices into a plurality of groupings. The commands can be writing operations and/or reading operations for one or more memory devices, such as memory devices of solid-state drives (SSDs).

Description of the Related Art

Host devices communicate with data storage devices for purposes of accessing memory to support operations of the host devices. Data storage devices can carry out commands in a manner that is out-of-order relative to the order in which the host devices send the commands.

Out-of-order operation can incur problems, such as requiring a large number of batch fills on the host device side and the data storage device side. Out-of-order operation can also involve wasting of power and resources because operations might be conducted by the data storage devices before being effectively canceled by the host devices. Additionally, out-of-order operation can complicate operations of the host devices.

Therefore, there is a need in the art for data storage devices that practically, simply, and efficiently facilitate out-of-order operation.

SUMMARY OF THE DISCLOSURE

Aspects of the present disclosure generally relate to data storage devices, systems, and related methods that group commands of doorbell transactions from host devices into a plurality of groupings. A controller of a data storage device is configured to receive a plurality of submission doorbell transactions comprising a plurality of commands from a host device. Each submission doorbell transaction of the plurality of submission doorbell transactions identifies a subset of one or more commands in a first command order.

The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. In one aspect, each completion doorbell transaction of the one or more completion doorbell transactions identifies the completed grouping in a second command order that is the same as the first command order, and the controller is configured to conduct the plurality of commands in a first operational order that is different from the first command order and the second command order. In one aspect, the controller is configured to conduct the plurality of commands in a second operational order that is the same as the first command order and the second command order. In one aspect, the controller is configured to receive a second plurality of submission doorbell transactions, scan the second plurality of submission doorbell transactions for an abort command, and after scanning the second plurality of submission doorbell transactions, conduct the plurality of commands.

In one embodiment, a data storage device includes one or more memory devices, and a controller coupled to the one or more memory devices. The controller is configured to receive a plurality of submission doorbell transactions having a plurality of commands in a first overall order from a host device. Each submission doorbell transaction of the plurality of submission doorbell transactions identifies a subset of one or more commands in a first command order. The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed.

In one embodiment, a data storage device includes one or more memory devices, and a controller coupled to the one or more memory devices. The controller is configured to receive a plurality of submission doorbell transactions having a plurality of commands in a first overall order from a host device. Each submission doorbell transaction of the plurality of submission doorbell transactions identifies a subset of one or more commands in a first command order. The controller is configure to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to receive a second plurality of submission doorbell transactions and scan the second plurality of submission doorbell transactions for an abort command. The controller is configured to, after scanning the second plurality of submission doorbell transactions, conduct the plurality of commands. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed.

In one embodiment, a data storage device includes one or more memory storage means, and a controller coupled to the one or more memory storage means. The controller is configured to receive a plurality of submission doorbell transactions having a plurality of commands from a host device. Each submission doorbell transaction of the plurality of submission doorbell transactions identifies a subset of one or more commands in a first command order. The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
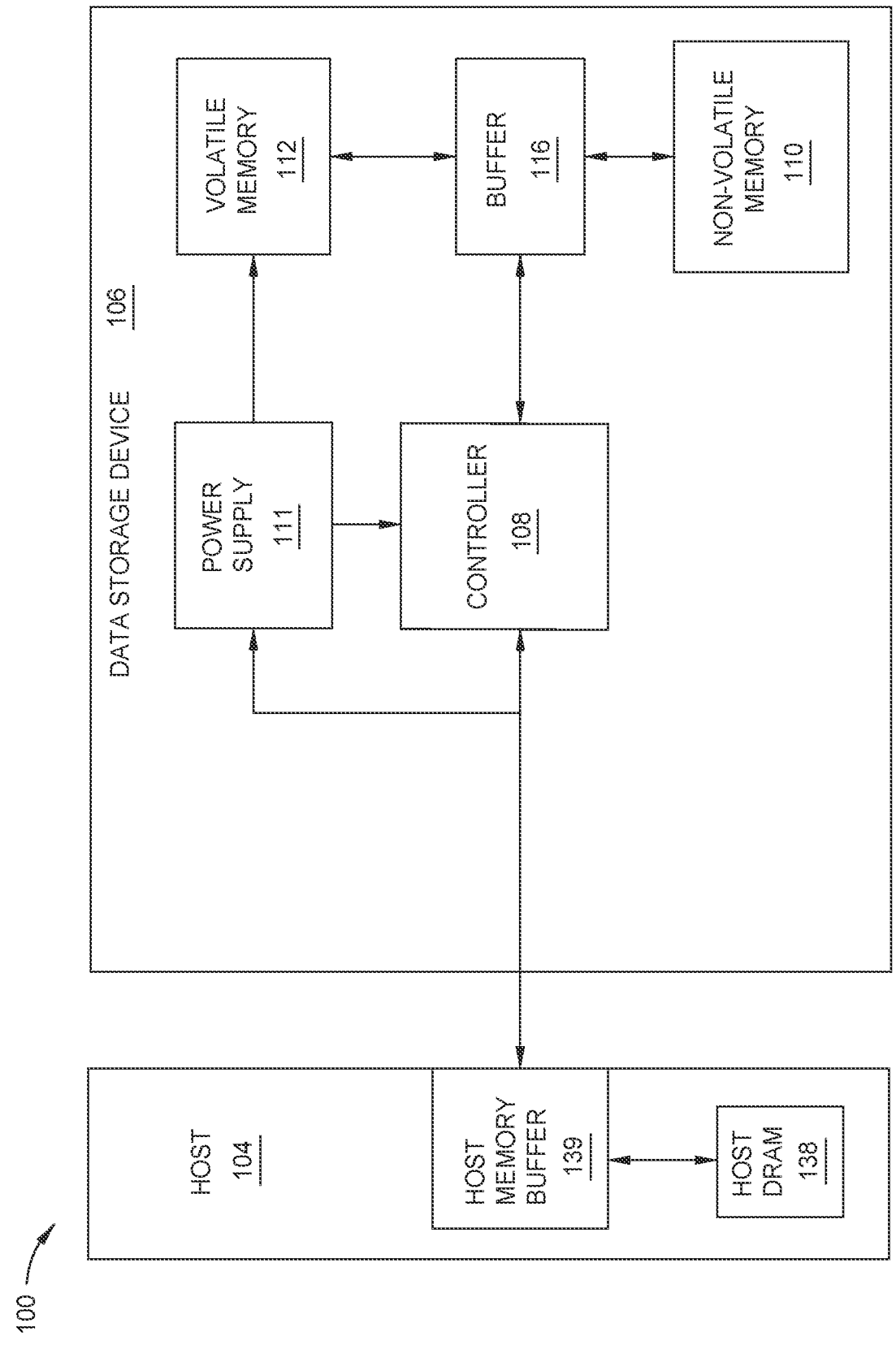
FIG. 1 is a schematic block diagram view of a storage system in which a data storage device may function as a storage device for a host device, according to one implementation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to data storage devices, systems, and related methods that group commands of doorbell transactions from host devices into a plurality of groupings. A controller of a data storage device is configured to receive a plurality of submission doorbell transactions comprising a plurality of commands from a host device. Each submission doorbell transaction of the plurality of submission doorbell transactions identifies a subset of one or more commands in a first command order.

The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. In one aspect, each completion doorbell transaction of the one or more completion doorbell transactions identifies the completed grouping in a second command order that is the same as the first command order, and the controller is configured to conduct the plurality of commands in a first operational order that is different from the first command order and the second command order. In one aspect, the controller is configured to conduct the plurality of commands in a second operational order that is the same as the first command order and the second command order. In one aspect, the controller is configured to receive a second plurality of submission doorbell transactions, scan the second plurality of submission doorbell transactions for an abort command, and after scanning the second plurality of submission doorbell transactions, conduct the plurality of commands.

FIG. 1 is a schematic block diagram view of a storage system 100 in which a data storage device 106 may function as a storage device for a host device 104, according to one implementation.

The host device 104 is in communication with the data storage device 106. As an example, the host device 104 may use a non-volatile memory (NVM) 110 included in the data storage device 106 to store and retrieve data. The host device 104 includes a host dynamic random-access memory (DRAM) 138. In one embodiment, which can be combined with other embodiments, the storage system 100 may include a plurality of storage devices, such as one or more additional data storage devices 106, which may operate as a storage array.

The host device 104 may store and/or retrieve data to and/or from one or more storage devices, such as the data storage device 106. As shown in FIG. 1, the host device 104 can communicate with the data storage device 106. A controller 108 of the data storage device 106 can communicate with a host memory buffer (HMB) 139 of the host device 104. The host device 104 can include any of a wide range of devices, including computer servers, network-attached storage (NAS) units, desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes the controller 108, the NVM 110, a power supply 111, a volatile memory 112, and a write buffer 116. In one embodiment, which can be combined with other embodiments, the write buffer 116 is a temporal memory. The controller 108 is coupled to the one or more memory devices of the NVM 110 and/or the volatile memory 112 through the write buffer 116. The data storage device 106 may include additional components not shown in FIG. 1 for the sake of clarity. For example, the data storage device 106 may include a printed circuit board (PCB) to which components of the data storage device 106 are mechanically attached. The PCB includes electrically conductive traces that electrically interconnect components of the data storage device 106 or the like. In one embodiment, which can be combined with other embodiments, the physical dimensions and connector configurations of the data storage device 106 conform to one or more standard form factors. Some example standard form factors include, but are not limited to, a 3.5" data storage device (e.g., a hard disk drive (HDD) or solid-state drive (SSD)), a 2.5" data storage device, a 1.8" data storage device, a peripheral component interconnect (PCI), PCI-extended (PCI-X), PCI Express (PCIe) (e.g., PCIe x1, x4, x8, x16, PCIe Mini Card, MiniPCI, etc.). In one embodiment, which can be combined with other embodiments, the data storage device 106 is directly coupled (e.g., directly soldered or plugged into a connector) to a motherboard of the host device 104.

The NVM 110 includes one or more memory devices or memory units. The NVM 110 may be configured to store and/or retrieve data. For instance, a memory device of NVM 110 may receive data and a message from controller 108 that instructs the memory device to store the data. Similarly, the memory unit may receive a message from the controller 108 that instructs the memory device to retrieve data. Each of the memory devices may be referred to as a die. In one embodiment, which can be combined with other embodiments, the NVM 110 includes a plurality of dies (e.g., a plurality of memory devices). Each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

Each memory unit can include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 can include a plurality of flash memory devices or memory units. The flash memory devices of the NVM 110 can include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices of the NVM 110 at the page level and erase data from NVM flash memory devices of the NVM 110 at the block level.

Each of the one or more memory devices of the NVM 110 includes a plurality of blocks in which data can be stored (e.g., written to). The controller 108 is configured to write data to and/or read data from the plurality of blocks of the NVM 110 in response to a message received by the controller 108 from the host device 104.

The power supply 111 provides power to one or more components of the data storage device 106. When operating in a standard mode, the power supply 111 may provide power to one or more components using power provided by an external device, such as the host device 104. The power supply 111 may provide power to the one or more components using power received from the host device 104 using the HIM 114 (shown in FIG. 2). In one embodiment, which can be combined with other embodiments, the power supply 111 includes one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. The amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components can also increase.

The volatile memory 112 may be used by controller 108 to store information. Volatile memory 112 may include one or more memory devices. In one embodiment, which can be combined with other embodiments, the controller 108 uses the volatile memory 112 as a cache. The controller 108 may store cached information in volatile memory 112 until the cached information is written to the NVM 110. As shown in FIG. 1, the volatile memory 112 can consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The controller 108 may manage one or more operations of the data storage device 106. For instance, controller 108 may manage the reading of data from and/or the writing of data to the NVM 110. In one embodiment, which can be combined with other embodiments, when the data storage device 106 receives a write command from the host device 104, the controller 108 initiates a data storage command to store data to the NVM 110 and monitor the progress of the data storage command. The controller 108 may determine at least one operational characteristic of the storage system 100 and store the at least one operational characteristic in the NVM 110.

Figure 2:
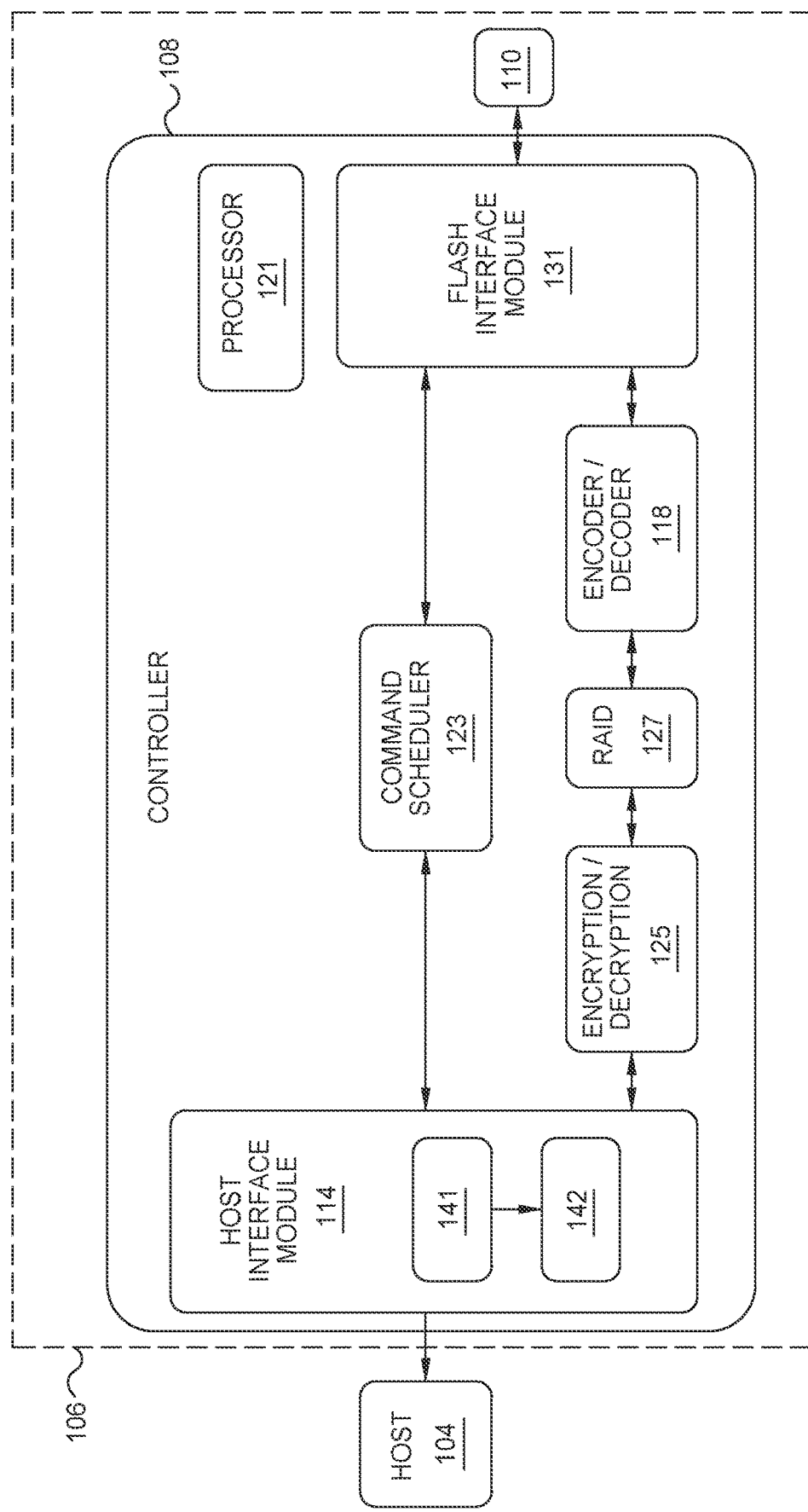
FIG. 2 is a schematic block diagram view of the controller shown in FIG. 1, according to one implementation.

FIG. 2 is a schematic block diagram view of the controller 108 shown in FIG. 1, according to one implementation. The data storage device 106 communications with the host device 104 using a host interface module (HIM) 114 in communication with the host device 104. The HIM 114 can communicate with the HMB 139 of the host device 104.

The HIM 114 can include one or both of a data bus for exchanging data with the host device 104 and a control bus for exchanging commands with the host device 104. The HIM 114 may operate in accordance with any suitable protocol. For example, the HIM 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The HIM 114 (e.g., the data bus, the control bus, or both) is electrically connected to the controller 108, providing an electrical connection between the host device 104 and the controller 108, and facilitating allowing data to be exchanged between the host device 104 and the controller 108. The electrical connection of the HIM 114 may also facilitate permitting the data storage device 106 to receive power from the host device 104. The power supply 111 (shown in FIG. 1) can receive power from the host device 104 using the HIM 114.

The HIM 114 includes a submission database 141 and a completion ordering logic 142 in communication with the submission database 141. The HIM 114 is configured to receive a plurality of submission doorbell transactions from the host device 104 and send one or more completion doorbell transactions to the host device 104. The controller 108 includes a processor 121, an encryption/decryption module 125, and a redundant array of independent disks (RAID) 127 having redundant information. The controller 108 includes a flash interface module (FIM) 131 in communication with the NVM 110, and a command scheduler 123 in communication with the FIM 131 to conduct a plurality of commands through the FIM 131. The FIM 131 is a logic of the controller 108. The plurality of commands include reading operations and/or writing operations that read from and/or write to NVM 110. The plurality of commands, when conducted, can indicate a status of the data storage device 106 and/or a configuration of the data storage device 106.

The controller 108 includes an encoder/decoder 118. In one example, which can be combined with other examples, the encoder/decoder 118 is a low density parity code (LDPC) encoder/decoder. In one example, which can be combined with other examples, the encoder/decoder 118 is an Exclusive-Or (XOR) encoder/decoder. The encoder/decoder 118 may include an internal memory to hold several matrices that include a plurality of error correction codes (ECC). The one or more matrices of the internal memory of the encoder/decoder 118 may allow for fast switching between matrices to avoid any firmware (FW) intervention or performance loss due to the time to switch between matrices. In one embodiment, which can be combined with other embodiments, when the controller 108 of the data storage device 106 receives a write command from the host device 104, the controller 108 temporarily stores the data associated with the write command in the internal memory of the encoder/decoder 118, in the volatile memory 112, or in the write buffer 116 before sending the data to the NVM 110 to be written.

In one embodiment, which can be combined with other embodiments, the controller 108 is configured according to non-volatile memory express (NVMe) protocol.

Figure 3:
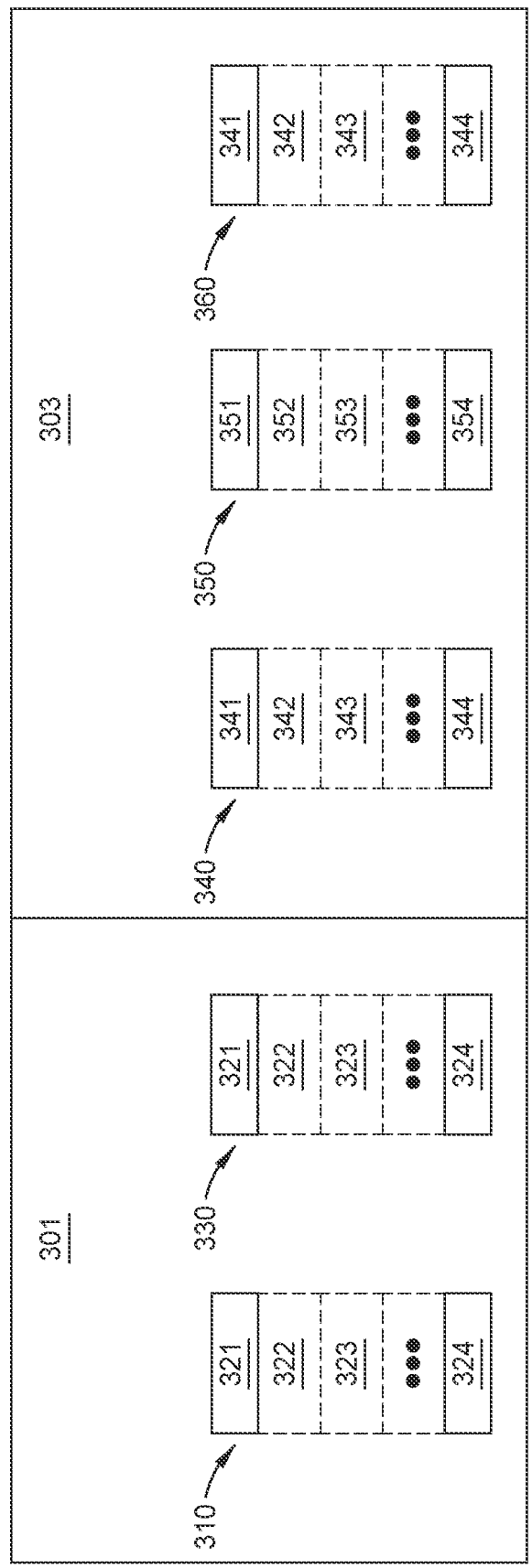
FIG. 3 is a schematic block diagram view of two cores of the host device shown in FIGS. 1 and 2, according to one implementation.

FIG. 3 is a schematic block diagram view of two cores 301, 303 of the host device 104 shown in FIGS. 1 and 2, according to one implementation. The cores 301, 303 can be part of the DRAM 138.

A first core 301 includes a submission queue 310 and a completion queue 330, showing 1:1 mapping. Each of the submission queue 310 and the completion queue 330 can include one or more commands 321-324. A respective command is written to a block of the submission queue 310 if the respective command is sent to the controller 108. The respective command is written to a block of the completion queue 330 if the respective command is part of a completion doorbell sent to the host device 104 from the controller 108 that indicates the respective command is completed. Each of the submission queue 310 and the completion queue 330 corresponds to the same queue of commands 321-324.

A second core 303 includes a first submission queue 340, a second submission queue 350, and a completion queue 360, showing 2:1 mapping. Each of the first submission queue 340 and the completion queue 360 corresponds to a first queue of commands 341-344. The second submission queue 350 corresponds to a second queue of commands 351-354.

Figure 4:
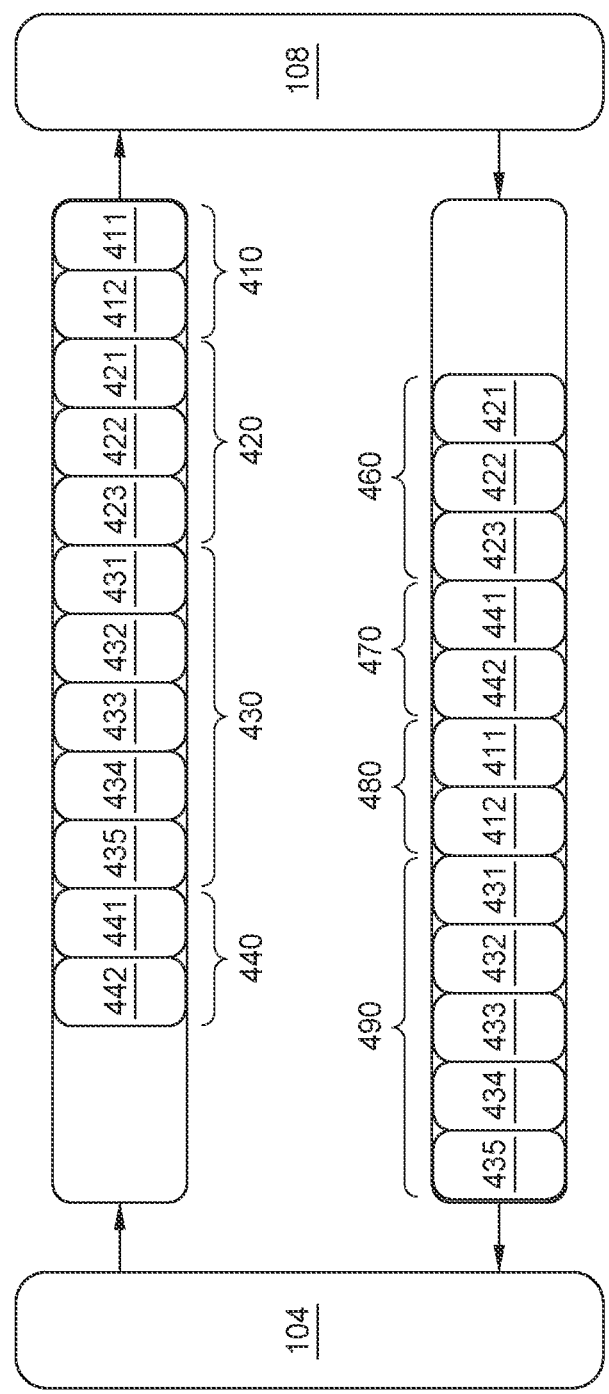
FIG. 4 is a schematic block diagram view of a doorbell operation flow in relation to the storage system shown in FIGS. 1 and 2, according to one implementation.

FIG. 4 is a schematic block diagram view of a doorbell operation flow in relation to the storage system 100 shown in FIGS. 1 and 2, according to one implementation. The controller 108 receives a plurality of submission doorbell transactions 410, 420, 430, and 440 having a plurality of commands 411, 412, 421-423, 431-435, 441, and 442 from the host device 104. The commands 411, 412, 421-423, 431-435, 441, and 442 are sent to the controller in a first overall order such that command 411 is first and command 442 is last. The plurality of submission doorbell transactions 410, 420, 430, and 440 correspond to a submission queue of a queue of commands.

Each submission doorbell transaction of the plurality of submission doorbell transactions 410, 420, 430, and 440 identifies a subset of one or more commands in a first command order. As an example, a third submission doorbell transaction 430 identifies a third subset of five commands 431-435. The five commands are in a first command order such that command 431 is first and command 435 is last within the third submission doorbell transaction 430. The submission doorbell transactions 410, 420, 430, and 440 are sent to the controller 108, and the controller 108 receives the submission doorbell transactions 410, 420, 430, and 440 in a grouping order such that submission doorbell transaction 410 is first and submission doorbell transaction 440 is last. The controller 108 groups the plurality of commands 411, 412, 421-423, 431-435, 441, and 442 into a plurality of groupings according to the grouping order. Each grouping of the plurality of groupings corresponds to a single doorbell transaction of the plurality of submission doorbell transactions 410, 420, 430, and 440.

The controller 108 sends one or more completion doorbell transactions 460, 470, 480, and 490 (four are shown) to the host device 104. The completion doorbell transactions 460, 470, 480, and 490 correspond to a completion queue of the queue of commands. Each completion doorbell transaction 460, 470, 480, and 490 identifies a completed grouping of the plurality of groupings in a second command order that is the same as the first command order of the grouping. The completed grouping indicates that the subset of one or more commands corresponding to the completed grouping is completed. The commands 411, 412, 421-423, 431-435, 441, and 442 sent to the host device 104 are maintained in the same groupings that the commands 411, 412, 421-423, 431-435, 441, and 442 were in when sent to the controller 108. In the implementation shown in FIG. 4, completed groupings are sent in a first completion grouping order that is different from the grouping order. As an example, a first completion doorbell transaction 460 (corresponding to the same grouping as a second submission doorbell transaction 420) is first and a fourth completion doorbell transaction 490 (corresponding to the same grouping as a third submission doorbell transaction 430) is last according to the first completion grouping order shown in FIG. 4. In one embodiment, which can be combined with other embodiments, the completion ordering logic 142 is configured to schedule the sending of the one or more completion doorbell transactions 460-490 in a second completion grouping order (not shown in FIG. 4) that is the same as the grouping order upon a determination that every one of the plurality of groupings is completed.

As an example, a fourth completion doorbell transaction 490 indicates that the third subset of commands 431-435 is completed. The third subset of commands 431-435 sent to the host device 104 are in a second command that is the same as the first command order when the third subset of commands 431-435 were sent to the controller 108. The commands 411, 412, 421-423, 431-435, 441, and 442 are sent to the host device 104 in a second overall order that is different than the first overall order.

The submission database 141 is configured to store the plurality of submission doorbell transactions 410, 420, 430, and 440 and the commands 411, 412, 421-423, 431-435, 441, and 442 therein. The submission database 141 is configured to store the plurality of groupings. The completion ordering logic 142 is configured to monitor the plurality of groupings in the submission database 141, and schedule the sending of the one or more completion doorbell transactions 460-490 to the host device 104 upon a determination that at least one of the plurality of groupings is completed.

The controller 108 is configured to conduct the plurality of commands 411, 412, 421-423, 431-435, 441, and 442 in a first operational order that is different from the first overall order, in an out-of-order manner. In one embodiment, which can be combined with other embodiments, the controller 108 is configured to conduct the plurality of commands in a second operational order that is the same as the first overall order, in an in-order manner. In such an embodiment, the completion ordering logic 142 is configured to schedule the sending of the completion doorbell transactions 460-490 to the host device 104 upon a determination that every one of the plurality of groupings is completed. The HIM 114 includes a command grouping logic configured to, for each of the plurality commands 411, 412, 421-423, 431-435, 441, and 442, identify the single doorbell transaction 410, 420, 430, or 440 under which each command was received, and group the respective command into a respective grouping corresponding to the single doorbell transaction 410, 420, 430, or 440.

The controller 108 is configured to receive a second plurality of submission doorbell transactions (not shown in FIG. 4) and scan the second plurality of submission doorbell transactions for an abort command. The controller 108 is configured to, after scanning the second plurality of submission doorbell transactions, conduct the plurality of commands 411, 412, 421-423, 431-435, 441, and 442 previously received. The abort command corresponds to a command of the plurality of commands 411, 412, 421-423, 431-435, 441, and 442, and the abort command includes instructions to abort the command. The abort command includes a unique identifier that identifies the command. The controller 108 is configured to, if detecting the abort command, remove the command from the one or more completion doorbell transactions 460-490. The command is removed from the plurality of groupings such that the command is not conducted by the controller 108, and such that the command is not part of the completion doorbell transactions 460, 470, 480, and 490. After removal of the command, the grouping to which the command previously belonged is fully completed upon completion of all other commands (other than the command that is aborted).

The controller 108 is configured to store the command in the submission database 141, and the command scheduler 123 does not schedule the command if the abort command is stored in the submission database 141. The completion ordering logic 142 is configured to monitor the plurality of groupings in the submission database 141 and remove the command from the one or more completion doorbell transactions 460-490 if the abort command is stored in the submission database 141.

The controller 108 is configured to, for each plurality of submission doorbell transactions received, wait to scan a subsequent plurality of submission doorbell transactions for an abort command prior to conducting the commands of the plurality of submission doorbell transactions initially received.

Figure 5:
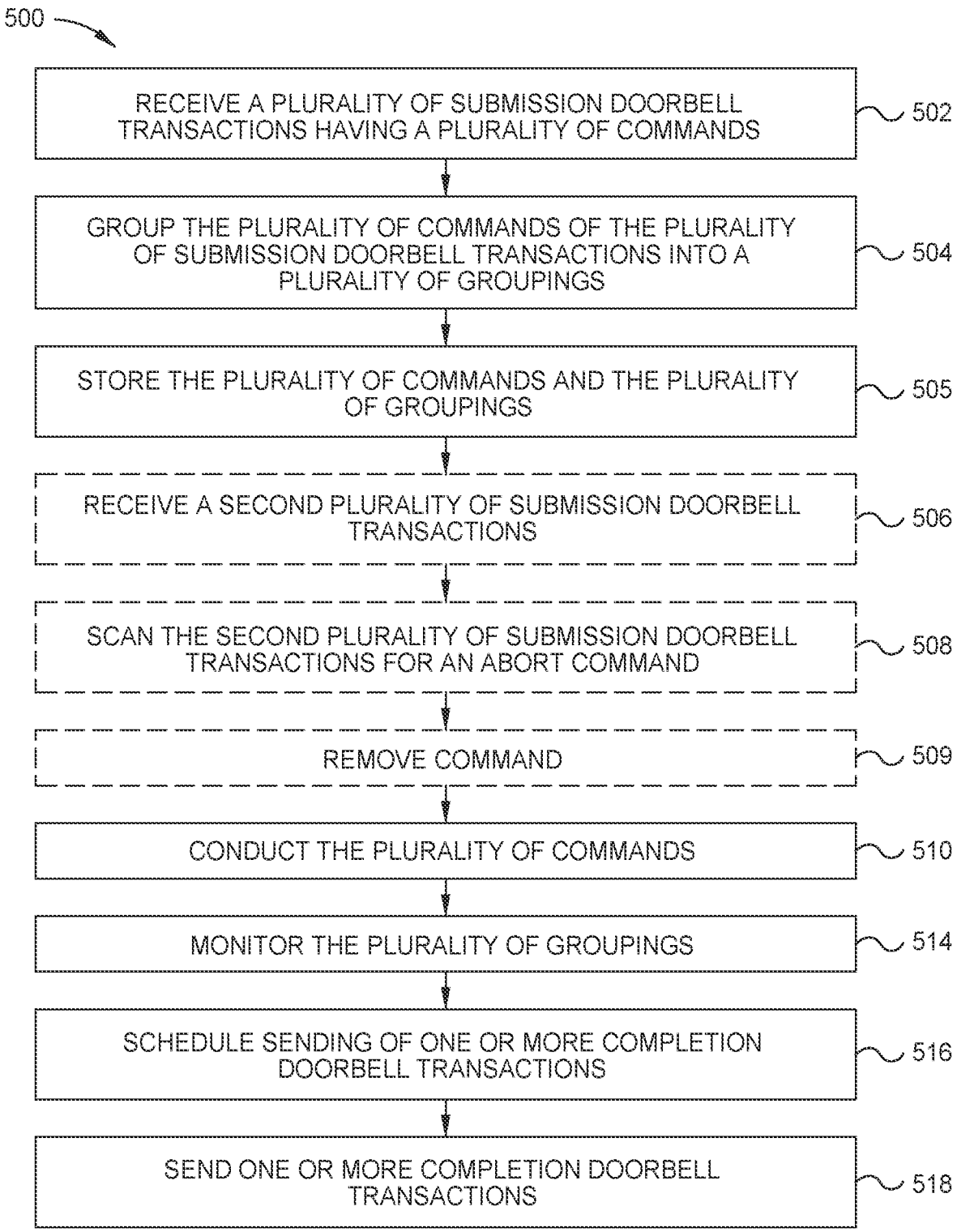
FIG. 5 is a schematic block diagram view of a method of determining writing fragmentation levels of memory devices, according to one implementation.

FIG. 5 is a schematic block diagram view of a method 500 of determining writing fragmentation levels of memory devices, according to one implementation. For purposes of clarity, the operations 502-518 of the method 500 are described herein in relation to the storage system 100. The present disclosure contemplates that the operations 502-518 of the method 500 can be conducted in relation to other storage systems. In one embodiment, which can be combined with other embodiments, the controller 108 is configured to conduct the operations 502-518 of the method 500. In one embodiment, which can be combined with other embodiments, the controller 108 is configured to conduct the operations 502-518 of instructing other components (such as the NVM 110, the command scheduler 123, the FIM 131, the submission database 141 of the HIM 114, the completion ordering logic 142 of the HIM 114, and/or other part(s) of the HIM 114) of the data storage device 106 to conduct the operations 502-518.

Operation 502 includes receiving a plurality of submission doorbell transactions having a plurality of commands in a first overall order from a host device. Each submission doorbell transaction of the plurality of submission doorbell transactions identifies a subset of one or more commands in a first command order.

Operation 504 includes grouping the plurality of commands of the plurality of submission doorbell transactions into a plurality of groupings having a grouping order. Each grouping of the plurality of groupings corresponds to a single doorbell transaction of the plurality of submission doorbell transactions. The grouping includes identifying the single doorbell transaction under which each command was received.

Operation 505 includes storing the plurality of commands and the plurality of groupings. The plurality of commands and the plurality of groupings are stored in the submission database 141.

Optional operation 506 includes receiving a second plurality of submission doorbell transactions.

Optional operation 508 includes scanning the second plurality of submission doorbell transactions for an abort command. The second plurality of submission doorbell transactions can be stored in the submission database 141, and the completion ordering logic 142 monitors the plurality of groupings in the submission database 141 and remove the command from the one or more completion doorbell transactions if the abort command is stored in the submission database 141.

Optional operation 509 includes removing a command corresponding to the abort command if the abort command is detected. The abort command can be stored in the submission database 141 if detected. The command is removed from the plurality of groupings and the one or more completion doorbell transactions.

Operation 510 includes conducting the plurality of commands. The controller 108 can fetch the plurality of commands from the host device 104 to conduct the plurality of commands. In one embodiment, which can be combined with other embodiments, the plurality of commands are conducted after the scanning of the second plurality of submission doorbell transactions. In one embodiment, which can be combined with other embodiments, the plurality of commands are conducted in a first operational order that is different from the first overall order. In one embodiment, which can be combined with other embodiments, the plurality of commands are conducted in a second operational order that is the same as the first overall order.

Operation 514 includes monitoring the plurality of groupings and the plurality of commands that are stored. The plurality of groupings are monitored for completion to determine if all the commands of a grouping are completed. Completed commands are detected and held until every one of the commands in a grouping (of the plurality of groupings are completed.

Operation 516 includes scheduling the sending of one or more completion doorbell transactions to the host device 104 upon a determination that at least one of the plurality of groupings is completed. Upon a determination that every one of commands in a grouping are completed, the grouping is scheduled to be sent to the host device 104 in the next single interrupt notification. In one embodiment, which can be combined with other embodiments, the method 500 waits for a determination that every one of the plurality of groupings is completed, and upon the determination, schedules the sending of one or more completion doorbell transactions in a second completion grouping order that is the same as the grouping order.

Operation 518 includes sending the one or more completion doorbell transactions to the host device 104. The one or more completion doorbell transactions are sent to the host device 104 as part of a single interrupt notification. Each completion doorbell transaction of the one or more completion doorbell transactions identifies a completed grouping of the plurality of groupings. The completed grouping indicates that the subset of one or more commands corresponding to the completed grouping is completed. For each completed grouping, the subset of one or more commands corresponding to the completed grouping is sent to the host device 104 in the same interrupt notification. Each completion doorbell transaction of the one or more completion doorbell transactions identifies the completed grouping in a second command order that is the same as the first command order. In one embodiment, which can be combined with other embodiments, the one or more completion doorbell transactions are sent in a first completion grouping order that is different from the grouping order. In one embodiment, which can be combined with other embodiments, the one or more completion doorbell transactions are sent in a second completion grouping order that is the same as the grouping order.

Figure 6:
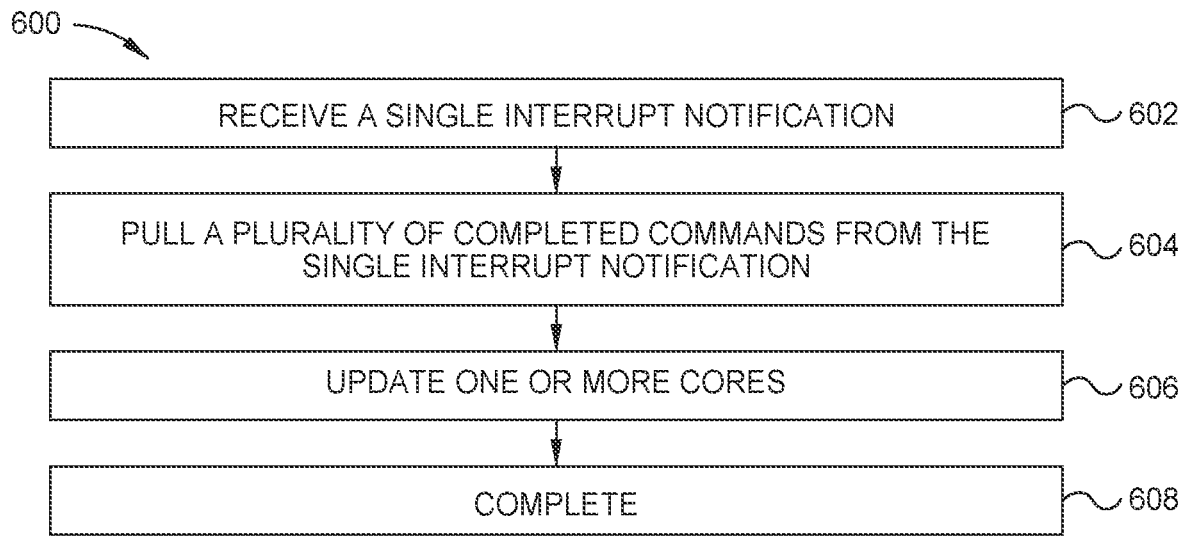
FIG. 6 is a schematic block diagram view of a method of using the host device, according to one implementation.

FIG. 6 is a schematic block diagram view of a method 600 of using the host device 104, according to one implementation. The method 600 can be used in relation to the method 500 shown in FIG. 5.

Operation 602 includes the host device 104 receiving the one or more completion doorbell transactions 460-490 from the controller 108 as part of a single interrupt notification.

Operation 604 includes the host device 104 pulling a plurality of completed commands from the single interrupt notification.

Operation 606 includes the host device 104, using the plurality of completed commands, updating one or more core(s) (such as the cores 301, 303 shown in FIG. 3) by writing the completed commands to completion queues (such as the completion queues 330, 360 shown in FIG. 3) of the one or more core(s). Updating the completion queues can update a subsequent plurality of submission doorbell transactions sent to the controller 108. As an example, a subsequent plurality of submission doorbell transactions can be updated to remove commands that have been completed. In such an example, corresponding commands of submission queues (such as submission queues 310, 340, and/or 350) can removed and/or written over when the completed commands are written to the completion queues.

The method 600 is complete at operation 608. The present disclosure contemplates that the method 600 can be repeated.

The method 600 shown in FIG. 6 for the host device 104 is relatively simple compared to the method 900 described below, facilitating out-of-order operation in a simple and efficient manner.

Figure 7:
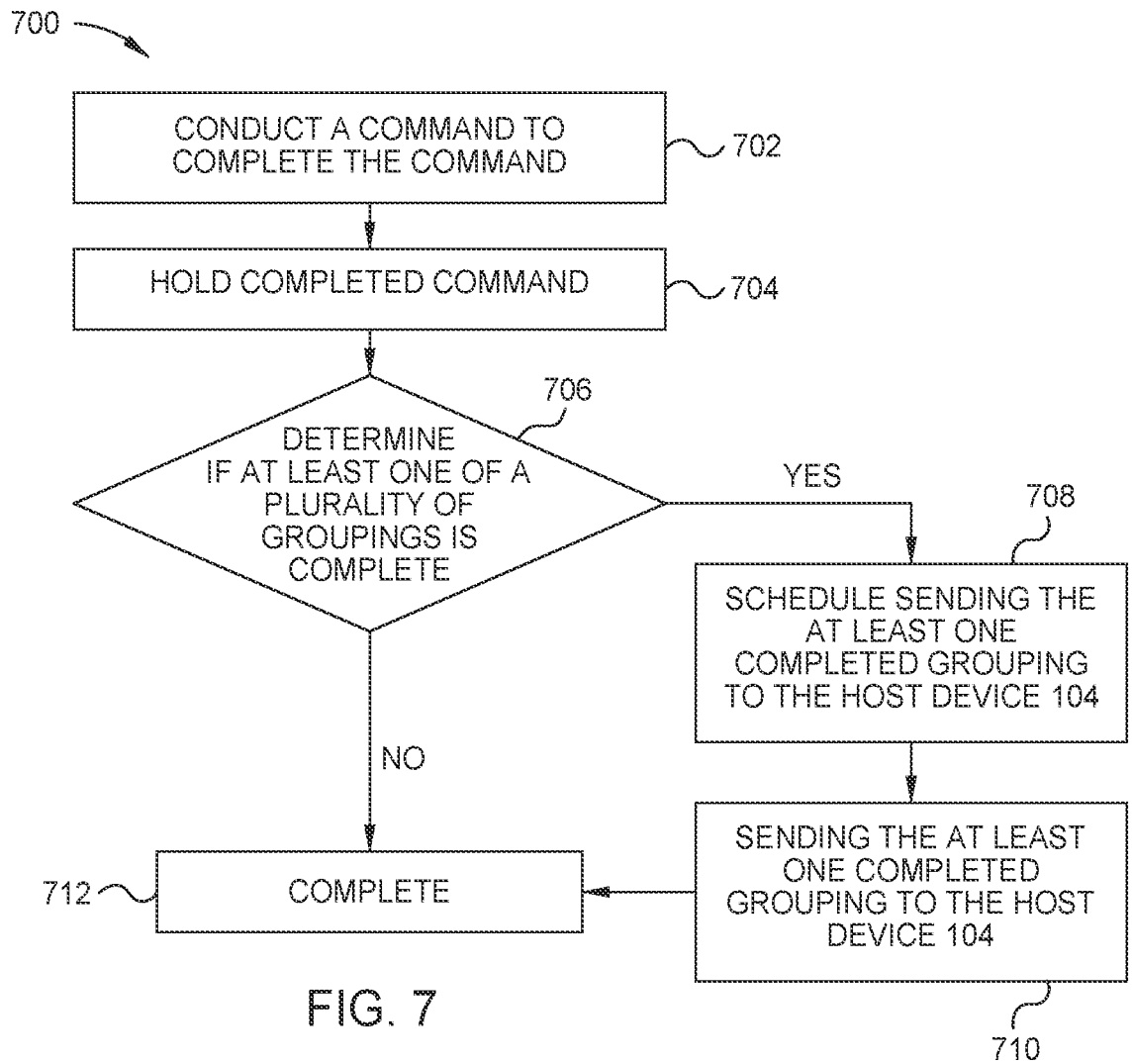
FIG. 7 is a schematic block diagram view of a method of using the data storage device, according to one implementation.

FIG. 7 is a schematic block diagram view of a method 700 of using the data storage device 106, according to one implementation. The method 700 can be used in relation to the method 500 shown in FIG. 5.

Operation 702 includes conducting a command to complete the command as a completed command.

Operation 704 includes holding the completed command at the controller 108.

Operation 706 includes determining if at least one of the plurality of groupings (such as one of the plurality of doorbell transactions 410, 420, 430, 440) is a grouping in which every one of the commands are completed.

If the answer to operation 706 is yes such that at least one of the plurality of groupings is complete, the method 700 proceeds to operation 708 and operation 710. Operation 708 includes scheduling sending of the at least one completed grouping to the host device 104 in the next single interrupt notification as a completion doorbell transaction. Operation 710 includes the controller 108 sending the single interrupt notification to the host device 104. The method 700 is then complete at block 712

If the answer is operation 706 is no such that not one of the plurality of groupings is complete, the method 700 is complete at block 712, and the method 700 continues to hold the completed command.

The present disclosure contemplates that the method 700 can be repeated.

Figure 8:
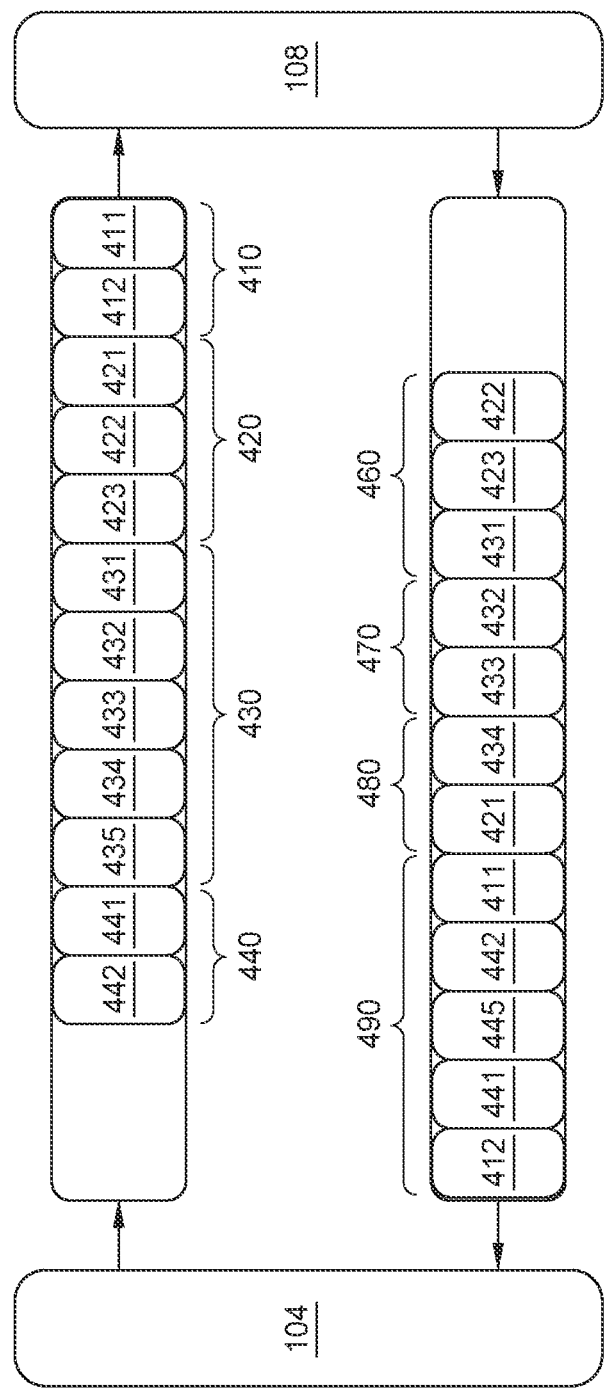
FIG. 8 is a schematic block diagram view of a doorbell operation flow in relation to a storage system, according to one implementation.

FIG. 8 is a schematic block diagram view of a doorbell operation flow in relation to a storage system, according to one implementation. The doorbell operation flow in FIG. 8 is similar to the doorbell operation flow in FIG. 4, and includes one or more of the aspects, features, components, and/or properties thereof.

The plurality of commands 411, 412, 421-423, 431-435, 441, and 442 are sent as part of completion doorbell transactions to the host device 104 in a second overall over that is different than the first overall order. The plurality of commands 411, 412, 421-423, 431-435, 441, and 442 are sent as part of completion doorbell transactions to the host device 104 in a second command order that is different than the first command order, and a first completion grouping order that is different from the grouping order.

Figure 9:
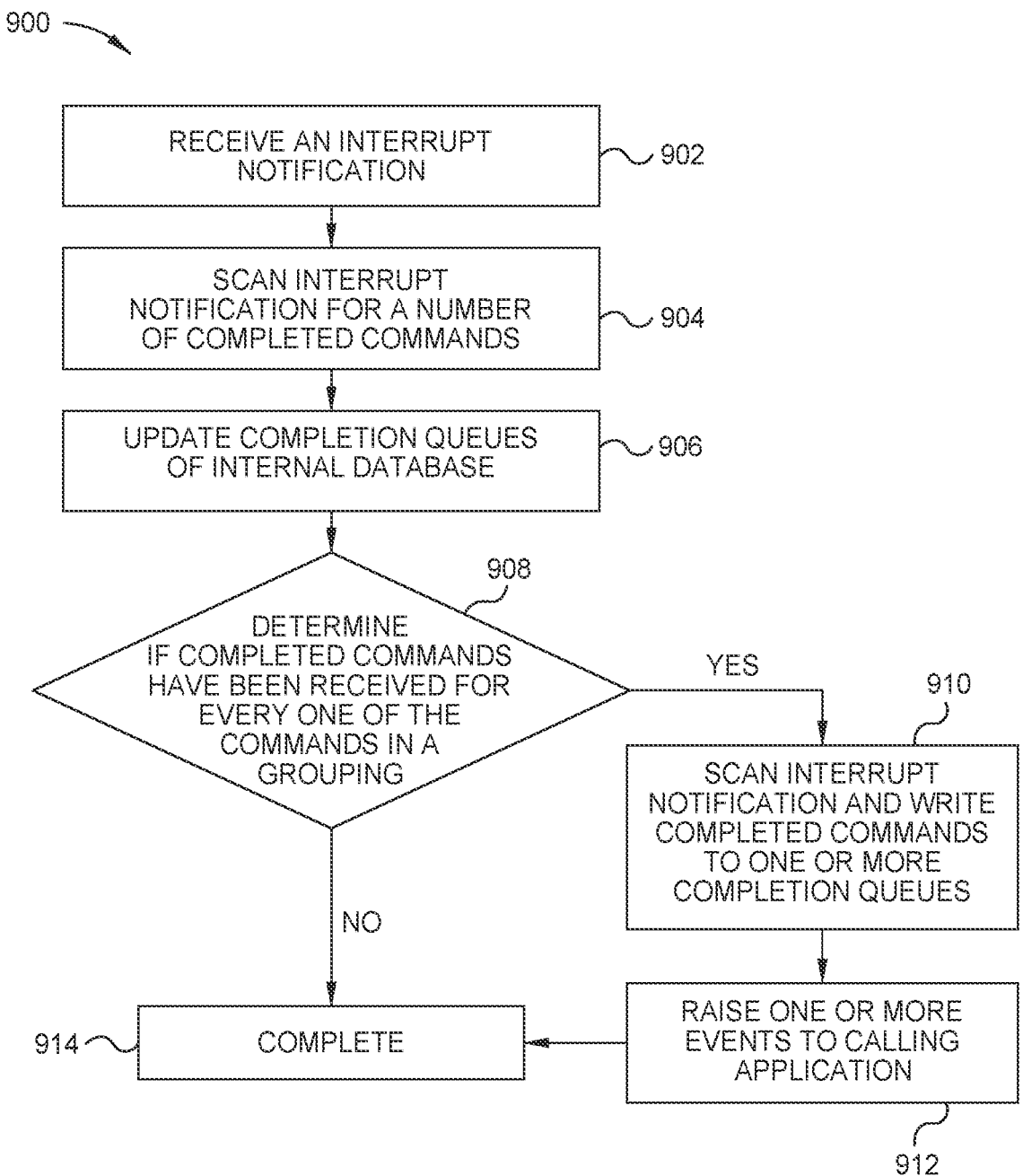
FIG. 9 is a schematic block diagram view of a method of using a host device, according to one implementation.

FIG. 9 is a schematic block diagram view of a method 900 of using a host device, according to one implementation. The method 900 can be used in relation to the doorbell operation flow shown in FIG. 8.

Operation 902 includes the host device receiving an interrupt notification from a data storage device.

Operation 904 includes scanning the interrupt notification for a number of completed commands.

Operation 906 includes updating one or more completion queues of an internal database of the host device.

Operation 908 includes determining if completed commands have been received for every one of the commands in a grouping.

If the answer to operation 908 is yes such that the grouping is completed, the method 900 proceeds to operation 910 and operation 912.

Operation 910 includes scanning the interrupt notification for completed commands and writing the completed commands to one or more completion queues of the host device. Operation 912 includes the host device raising one or more events to a calling application. The one or more events correspond to the completed commands. The method 900 then is complete at block 914.

If the answer to operation 908 is no such that the grouping is not complete, the method 900 is complete at block 900.

The present disclosure contemplates that the method 900 can be repeated. As shown by the method 600 in FIG. 6, the operation of host devices is simplified and streamlined (compared to the method 900 shown in FIG. 9) using aspects described herein while facilitating out of order operation of commands in data storage devices.

Benefits of the present disclosure include simplicity and practicality, efficiency, device performance, reduced waste, and reduced expenditure of resources. As an example, the controller 108 grouping the plurality of commands of the plurality of submission doorbell transactions into a plurality of groupings facilitates out-of-order operation for the controller 108. Out-of-order operation facilitates device performance by prioritizing commands for operation and enhancing pipeline utilization, and facilitates efficiency and reduced latency (e.g., increased quality of service) by reducing the time between the host device 104 sending a command and receiving a notification that the command is completed. As another example, the controller 108 identifying the completed grouping in a second command order that is the same as the first command order facilitates out-of-order operation for the controller 108 while facilitating reduced complexity and expenditure of resources for the host device 104. It is believed that, using aspects described herein, complexity is significantly reduced for the host device 104 while maintaining out-of-order operation for the data storage device 106.

Additionally, as an example, scanning a second plurality of submission doorbell transactions for an abort command prior to conducting commands of a plurality of doorbell transactions facilitates efficiency and reduced wasting of power and resources. Using aspects described herein, a controller 108 can cancel aborted commands prior to such commands being conducted by the controller 108.

Such benefits can be amplified for certain applications, such as gaming, where the out-of-order posting of completed commands to completion queues can be limited by operational constraints.

It is contemplated that one or more aspects disclosed herein may be combined. Moreover, it is contemplated that one or more aspects disclosed herein may include some or all of the aforementioned benefits. As an example, operations, aspects, components, features, and/or properties of the storage system 100, the cores 301, 303, the submission doorbell transactions 410, 420, 430, and/or 440, the completion doorbell transactions 460-490, and/or the method 500 may be combined. In one embodiment, which can be combined with other embodiments, one or more operations described in relation to FIG. 4 are combined with one or more operations described in relation to the method 500 shown in FIG. 5.

In one embodiment, a data storage device includes one or more memory devices, and a controller coupled to the one or more memory devices. The controller is configured to receive a plurality of submission doorbell transactions having a plurality of commands in a first overall order from a host device. Each submission doorbell transaction of the plurality of submission doorbell transactions identifies a subset of one or more commands in a first command order. The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed. Each completion doorbell transaction of the one or more completion doorbell transactions identifies the completed grouping in a second command order that is the same as the first command order. The controller is also configured to conduct the plurality of commands in a first operational order that is different from the first overall order. The controller includes a host interface module (HIM). The HIM includes a submission database configured to store the plurality of commands, and a completion ordering logic in communication with the submission database. The controller is also configured to store the plurality of groupings in the submission database. The completion ordering logic is configured to monitor the plurality of groupings in the submission database, and schedule the sending of the one or more completion doorbell transactions to the host device upon a determination that at least one of the plurality of groupings is completed. The controller is also configured to conduct the plurality of commands in a second operational order that is the same as the first overall order. The completion ordering logic is configured to schedule the sending of the one or more completion doorbell transactions to the host device upon a determination that every one of the plurality of groupings is completed. The completion ordering logic is configured to schedule the sending of the one or more completion doorbell transactions in a completion grouping order upon the determination that every one of the plurality of groupings is completed. The completion grouping order is the same as the grouping order. The HIM includes a command grouping logic configured to, for each of the plurality commands, identify the single doorbell transaction under which each command was received. The controller includes a processor, a flash interface module (FIM) in communication with the one or more memory devices, and a command scheduler in communication with the FIM to conduct the plurality of commands through the FIM. The plurality of commands include one or more of reading operations or writing operations.

In one embodiment, a data storage device includes one or more memory devices, and a controller coupled to the one or more memory devices. The controller is configured to receive a plurality of submission doorbell transactions having a plurality of commands in a first overall order from a host device. Each submission doorbell transaction of the plurality of submission doorbell transactions identifies a subset of one or more commands in a first command order. The controller is configure to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to receive a second plurality of submission doorbell transactions and scan the second plurality of submission doorbell transactions for an abort command. The controller is configured to, after scanning the second plurality of submission doorbell transactions, conduct the plurality of commands. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed. The abort command corresponds to a command of the plurality of commands of the plurality of submission doorbell transactions. The abort command includes instructions to abort the command. The abort command includes a unique identifier that identifies the command. The controller is also configured to, if detecting the abort command, remove the command from the one or more completion doorbell transactions. The plurality of commands are conducted in a first operational order that is different from the first overall order. The second plurality of submission doorbell transactions includes a second plurality of commands, and the controller includes a host interface module (HIM). The HIM includes a submission database configured to store the plurality of commands and the second plurality of commands, and a completion ordering logic in communication with the submission database. The controller includes a command scheduler in communication with the HIM. The command scheduler does not schedule the command if the abort command is stored in the submission database. The completion ordering logic is configured to monitor the plurality of groupings in the submission database and remove the command from the one or more completion doorbell transactions if the abort command is stored in the submission database.

In one embodiment, a data storage device includes one or more memory storage means, and a controller coupled to the one or more memory storage means. The controller is configured to receive a plurality of submission doorbell transactions having a plurality of commands from a host device. Each submission doorbell transaction of the plurality of submission doorbell transactions identifies a subset of one or more commands in a first command order. The controller is configured to group the plurality of commands of the plurality of submission doorbell transactions into a plurality of groupings having a grouping order. Each grouping of the plurality of groupings corresponds to a single doorbell transaction of the plurality of submission doorbell transactions. The controller is configured to send one or more completion doorbell transactions to the host device. Each completion doorbell transaction of the one or more completion doorbell transactions identifies a completed grouping of the plurality of groupings. The completed grouping indicates that the subset of one or more commands corresponding to the completed grouping is completed.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices, wherein the controller is configured to:
receive a plurality of submission doorbell transactions comprising a plurality of commands in a first overall order from a host device, each submission doorbell transaction of the plurality of submission doorbell transactions identifying a subset of one or more commands in a first command order, wherein the plurality of submission doorbell transactions are from a first submission queue,
group the plurality of commands of the plurality of submission doorbell transactions into a plurality of groupings having a grouping order, each grouping of the plurality of groupings corresponding to a single doorbell transaction of the plurality of submission doorbell transactions,
receive a second plurality of submission doorbell transactions, wherein the second plurality of submission doorbell transactions are disposed in a second submission queue, wherein the second submission queue is distinct from the first submission queue,
scan the second plurality of submission doorbell transactions for an abort command, wherein the abort command is in the second submission queue, and
send one or more completion doorbell transactions to the host device, each completion doorbell transaction of the one or more completion doorbell transactions identifying a completed grouping of the plurality of groupings, the completed grouping indicating that the subset of one or more commands corresponding to the completed grouping is completed, wherein the subset of one or more commands comprises a plurality of commands, wherein the plurality of groupings are sent in a completion grouping order that is different from the grouping order.

2. The data storage device of claim 1, wherein each completion doorbell transaction of the one or more completion doorbell transactions identifies the completed grouping in a second command order that is the same as the first command order.

3. The data storage device of claim 2, wherein the controller is further configured to conduct the plurality of commands in a first operational order that is different from the first overall order.

4. The data storage device of claim 1, wherein the controller comprises a host interface module (HIM), the HIM comprising:
a submission database configured to store the plurality of commands; and a completion ordering logic in communication with the submission database.

5. The data storage device of claim 4, wherein the controller is further configured to store the plurality of groupings in the submission database.

6. The data storage device of claim 5, wherein the completion ordering logic is configured to:
monitor the plurality of groupings in the submission database; and
schedule the sending of the one or more completion doorbell transactions to the host device upon a determination that at least one of the plurality of groupings is completed, wherein for each completed grouping, the subset of one or more commands corresponding to the completed grouping is sent to the host device in the same interrupt notification.

7. The data storage device of claim 6, wherein the controller is further configured to conduct the plurality of commands in a second operational order that is the same as the first overall order.

8. The data storage device of claim 7, wherein the completion ordering logic is configured to:
schedule the sending of the one or more completion doorbell transactions to the host device upon a determination that every one of the plurality of groupings is completed.

9. The data storage device of claim 8, wherein the completion ordering logic is configured to:
schedule the sending of the one or more completion doorbell transactions in the completion grouping order upon the determination that every one of the plurality of groupings is completed.

10. The data storage device of claim 4, wherein the HIM is further configured to, for each of the plurality commands, identify the single doorbell transaction under which each command was received.

11. The data storage device of claim 10, wherein the controller further comprises:
a processor;
a flash interface module (FIM) in communication with the one or more memory devices; and
a command scheduler in communication with the FIM to conduct the plurality of commands through the FIM, the plurality of commands including one or more of reading operations or writing operations.

12. A data storage device, comprising:
one or more memory devices; and
a controller coupled to the one or more memory devices, wherein the controller is configured to:
receive a plurality of submission doorbell transactions comprising a plurality of commands in a first overall order from a host device, each submission doorbell transaction of the plurality of submission doorbell transactions identifying a subset of one or more commands in a first command order, wherein the plurality of submission doorbell transactions are from a first submission queue,
group the plurality of commands of the plurality of submission doorbell transactions into a plurality of groupings having a grouping order, each grouping of the plurality of groupings corresponding to a single doorbell transaction of the plurality of submission doorbell transactions,
receive a second plurality of submission doorbell transactions, wherein the second plurality of submission doorbell transactions are disposed in a second submission queue, wherein the second submission queue is distinct from the first submission queue,
scan the second plurality of submission doorbell transactions for an abort command,
after scanning the second plurality of submission doorbell transactions, conduct the plurality of commands, wherein the abort command is in the second submission queue, and
send one or more completion doorbell transactions to the host device, each completion doorbell transaction of the one or more completion doorbell transactions identifying a completed grouping of the plurality of groupings, the completed grouping indicating that the subset of one or more commands corresponding to the completed grouping is completed, wherein the subset of one or more commands comprises a plurality of commands, wherein the plurality of groupings are sent in a first completion grouping order that is different from the grouping order.

13. The data storage device of claim 12, wherein the abort command corresponds to a command of the plurality of commands of the plurality of submission doorbell transactions, and the abort command includes instructions to abort the command.

14. The data storage device of claim 13, wherein the abort command comprises a unique identifier that identifies the command.

15. The data storage device of claim 13, wherein the controller is further configured to, if detecting the abort command, remove the command from the one or more completion doorbell transactions.

16. The data storage device of claim 15, wherein the plurality of commands are conducted in a first operational order that is different from the first overall order.

17. The data storage device of claim 13, wherein the second plurality of submission doorbell transactions comprises a second plurality of commands, and the controller comprises a host interface module (HIM), the HIM comprising:
a submission database configured to store the plurality of commands and the second plurality of commands; and
a completion ordering logic in communication with the submission database.

18. The data storage device of claim 17, wherein:
the controller further comprises a command scheduler in communication with the HIM;
the command scheduler does not schedule the command if the abort command is stored in the submission database; and
the completion ordering logic is configured to monitor the plurality of groupings in the submission database and remove the command from the one or more completion doorbell transactions if the abort command is stored in the submission database.

19. A data storage device, comprising:
one or more memory means; and
a controller coupled to the one or more memory means, wherein the controller is configured to:
receive a plurality of submission doorbell transactions comprising a plurality of commands from a host device, each submission doorbell transaction of the plurality of submission doorbell transactions identifying a subset of one or more commands in a first command order, wherein the plurality of submission doorbell transactions are from a first submission queue, group the plurality of commands of the plurality of submission doorbell transactions into a plurality of groupings having a grouping order, each grouping of the plurality of groupings corresponding to a single doorbell transaction of the plurality of submission doorbell transactions, receive a second plurality of submission doorbell transactions, wherein the second plurality of submission doorbell transactions are from a second submission queue, wherein the second submission queue is distinct from the first submission queue, scan the second plurality of submission doorbell transactions for an abort command, wherein the abort command is in the second submission queue, and send one or more completion doorbell transactions to the host device, each completion doorbell transaction of the one or more completion doorbell transactions identifying a completed grouping of the plurality of groupings, the completed grouping indicating that the subset of one or more commands corresponding to the completed grouping is completed, wherein the subset of one or more commands comprises a plurality of commands, wherein the plurality of groupings are sent in a first completion grouping order that is different from the grouping order.

20. The data storage device of claim 19, wherein the first submission queue and the second submission queue are disposed in a same core.

* * * * *